June 8, 1943.  V. S. DE BOLT  2,321,276
TURBO-COMPRESSOR
Filed Sept. 20, 1939  4 Sheets-Sheet 1

INVENTOR

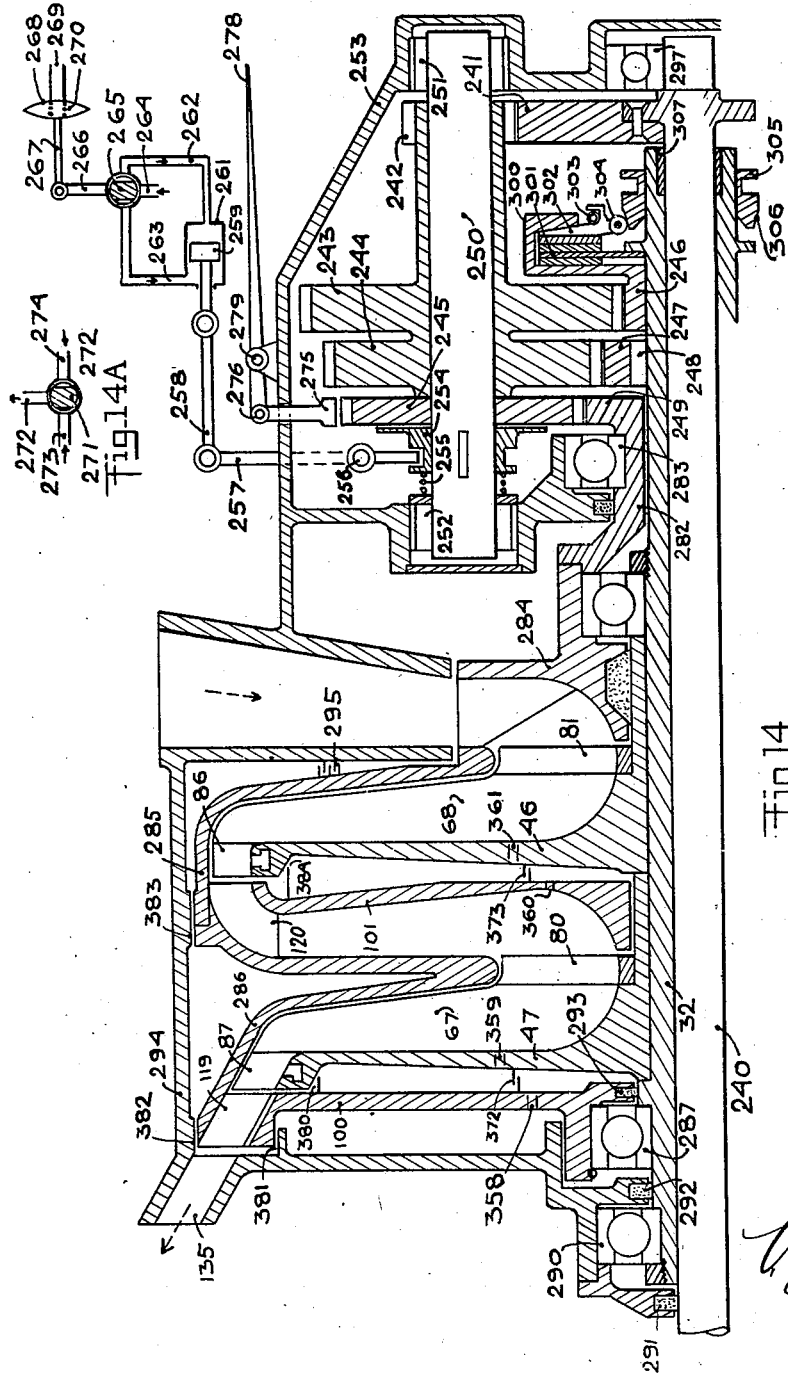

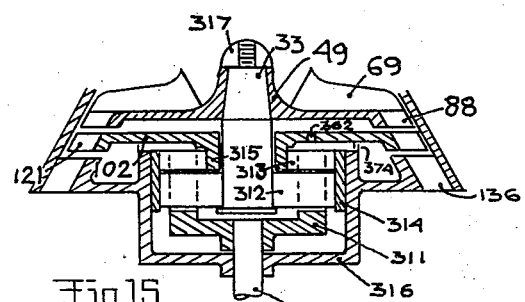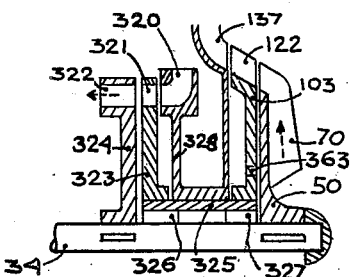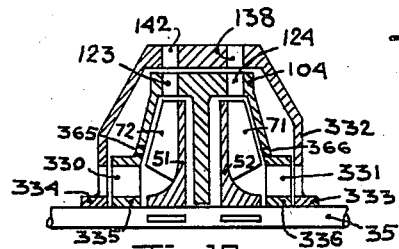

Patented June 8, 1943

2,321,276

UNITED STATES PATENT OFFICE 2,321,276

TURBOCOMPRESSOR

Vaughn S. De Bolt, Washington Court House, Ohio

Application September 20, 1939, Serial No. 295,772

5 Claims. (Cl. 230—114)

This invention relates to a turbocompressor, turbopump, turbosupercharger, turbotransmission, exhaust driven supercharger, gas turbine, and the like, where an impeller energizes a fluid producing pressure energy and velocity energy which velocity energy is then changed into pressure energy.

The turbopumping devices of hitherto known design produce a pressure by means of centrifugal force; however, there is usually about 50% of impeller energy transformed into velocity energy of the whirling fluid which energy must be changed into pressure by diverging vanes, by a diffusor or a guide wheel, by a whirlpool chamber, volute or spiral housing. As well known, this change of velocity into pressure is very inefficient and is the chief source of inefficiency of all turbo pumping devices because until now there was no method known how to change velocity into pressure efficiently; best efficiency is about 75%.

My invention presents a new and only method and means to change velocity into pressure very efficiently by inserting a turbine between an impeller and its diffusor, whereas large part of velocity energy is absorbed by turbine blades very efficiently and does not need to be changed into pressure energy. In this way I can reach efficiency of 95%; this represents a great saving which is the main object of the invention.

Another object of the invention is to gear the mentioned turbine to the pump in such a way that all energy absorbed by the turbine helps to drive the pump.

Another object of the invention is to change this gearing, to lock the turbine or to unlock it and let to run free in order to change characteristics of the pump.

Another object of this invention is to make possible to design extremely high speed pumps and still keep their efficiency high because of comparatively low entrance velocity into guide vanes because the guide vanes (turbine) move in the direction of fluid flow.

This invention is applicable to pumps, compressors, superchargers, turbo transmissions, and the like, increasing their efficiencies.

Other objects of the invention are: simplicity, compactness, low manufacturing cost, and above all increase in efficiency heretofore not obtainable.

With these and other objects in view my invention consists in the combination, arrangement and construction hereinafter described, claimed and illustrated in the accompanying drawings, it being understood that many changes may be made in size, proportion of the parts and details of construction within the scope of the appended claims, without departing from the spirit or sacrificing advantages of the invention.

Some of the many possible embodiments of the invention are illustrated in the accompanying drawings.

Figure 14 is a half longitudinal section showing a multistage supercharger with its transmission constructed in accordance with my invention.

Fig. 14A illustrates diagrammatically a valve mechanism of Fig. 14.

Figure 15 shows a vertical supercharger.

Figure 16 is a longitudinal section showing a turbine driven supercharger.

Figure 17 shows a nozzle of the same supercharger.

Figure 18 is a section illustrating a double suction pump.

Figure 19 is a longitudinal section showing a two stage turbocompressor.

Figure 20 illustrates diagrammatically a pump having a whirlpool chamber and a spiral case.

Figure 21 shows a pump with diffusor ring and spiral case.

Figure 22 illustrates turbine blades.

Fig. 22A illustrates an alternative design of the blades of Fig. 22.

Centrifugal pumps of today for compressible or non compressible fluids consist mainly of impeller surrounded by a diffusor containing diffusion vanes which provide gradually enlarging passages whose function it is to reduce velocity of the fluid leaving the impeller and thus transform velocity head into pressure head. The casing surrounding the diffusion ring may be either circular and concentric with the impeller or it may be of a spiral form.

Another type of pumps are those which have no diffusion vanes but instead, the casing is of a spiral type made so as to produce an equal velocity of flow at all sections around the circumference and also to gradually reduce the velocity of the fluid as it flows from the impeller to the discharge pipe. Thus the energy transformation is accomplished in another way. The spiral is often called a volute whence the pump has received its name: a volute pump. Occasionally pumps have been built with what is called a whirlpool chamber. This consists of a ring surrounding the impeller, the width of which, parallel to the shaft, is the same as that of the impeller. Since the fluid from the impeller enters this space with a velocity having a tangential component it may be seen that the path of the fluid will be some form of a spiral and that its velocity will gradually diminish as it approaches the outer circumference with a consequent increase in pressure. This whirlpool chamber is then surrounded by either a circular or a spiral case in the same manner as a pump with a diffusor. Actual measurements indicate that the efficiency of diffusors, volutes, whirlpool chambers or spiral cases is poor, it very seldom reaches 50%, because the change of kinetic energy into potential energy is not complete nor gradual, especially at high speeds.

Pumps designed according to this invention differ from the pumps as known today by having a rotary turbine runner at the periphery of impeller inserted between exit from the impeller and the entrance into the diffusor or volute.

The turbine blades rotate usually slower than the impeller and absorb large part or all of the kinetic energy from the fluid. This energy can be either brought back to the impeller or can be used for some other purpose such as driving accessories on airplanes, automobiles, boats, which are not shown here, etc.

Figure 1:
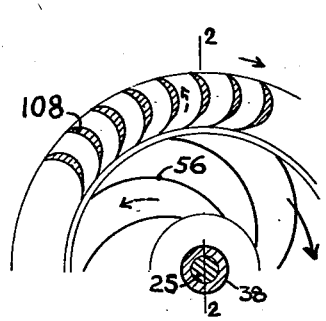
Figure 1 is a diagrammatic section taken on line 1—1 of Figure 2 illustrating a turbo pump constructed in accordance with my invention.
Figures 2, 3:
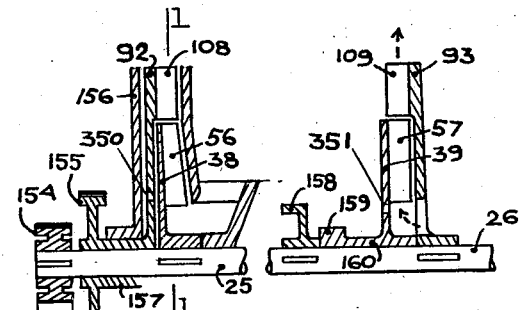
Figure 2 is a diagrammatic longitudinal section of the pump of Figure 1.
Figure 3 is a longitudinal section of an alternative design of a pump.

Figures 1 and 2 illustrate a pump having an impeller 38 with blades 56 and turbine 92 with radial antireaction blades 108 rotating in the housing 156; the impeller being mounted on a shaft 25 is driven by a belt pulley 154; the turbine being integral with a sleeve 157 drives a belt pulley 155. These pulleys are driven by another common pulley 163 by means of belts 161 and 162 or they can be driven by different pulleys by means of an electric motor, engine or turbine (not shown). Turbine is equipped with thrust balancing openings 350. Long, solid line arrow indicates high rotary speed of impeller; short solid line arrow indicates medium rotary speed of turbine; dotted line arrows indicate relative velocity of fluid through blades (similar designation being used throughout entire specification).

In Figure 3 somewhat different arrangement is used:

A belt pulley 159 drives an impeller 39 by means of a sleeve 160; a turbine 93 mounted on a shaft 26 drives a pulley 158. The impeller 39 carries blades 57 and is provided by balancing openings 351; the turbine 95 has blades 109.

Figure 4:
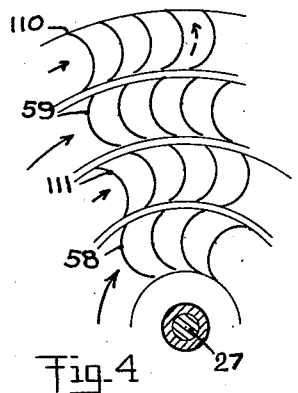
Figures 4 and 5 illustrate diagrammatically a radial multistage turbo pump.
Figure 5:
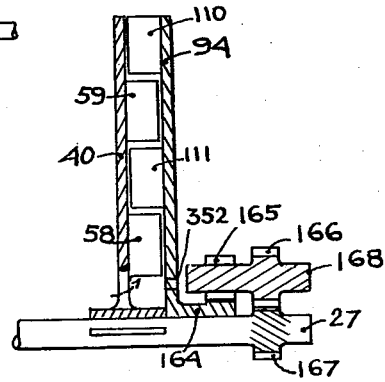

Figures 4 and 5 illustrate a two stage radial pump having an impeller 40 driven by a shaft 27 which is equipped with a gear 167, and a turbine 94 driving a gear 164; gears 167 and 164 are then geared together by means of a countershaft 168 being integral with gears 165 (in mesh with gear 164) and 166 meshing with gear 167. The turbine 94 is provided with balancing openings 352 and has blades 110 and 111. The impeller has blades 58 and 59.

Long arrows indicate high speeds of impellers, short arrows represent medium speeds of turbines.

The impeller and the turbine are, of course, to be inserted in a casing with a stationary diffusor or volute or spiral chamber (not shown).

Figure 6:
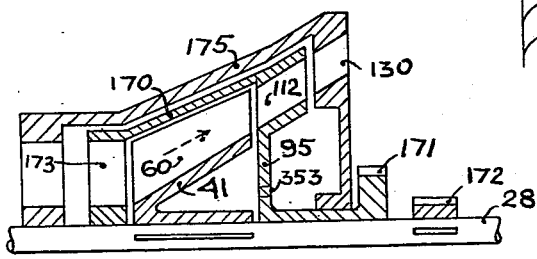
Figure 6 is a longitudinal section through a semi radial compressor.

Figure 6 illustrates an embodiment of the invention what can be called a semi axial flow compressor.

An impeller 41 and a turbine 95 rotate in a casing 170 equipped with a diffusor 130. For a drive the turbine has a gear 171, impeller shaft 28 being equipped by a gear 172. The turbine 95 has balancing openings 353.

The compressor of Figure 6 is characterized by having slow speed impeller blades 173 driven by the turbine 95. The object of this construction is: Any fluid is picked up or sucked in more efficiency by a slow speed impeller than by a high speed one; entrance impeller blades 173 suck the fluid in, give it initial energizing and feed the fluid further into the high speed impeller under positive pressure which insures better volumetric and overall efficiency.

Figure 7:
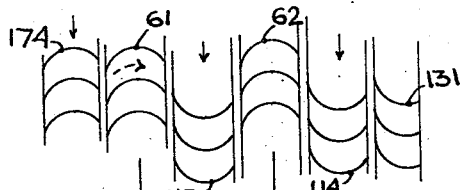
Figure 7 illustrates blading of an axial multistage compressor.

Figure 7 illustrates a two stage blading of a compressor otherwise similar to the pump of Figure 6. Here slow speed impeller vanes 174 feed fluid into high speed impeller blades 61 and further 62. Turbine blades 113 and 114 drive the entrance impeller blades 174 in a similar way as in Figure 6.

Figures 8, 10, 12 and 13 illustrate a supercharger for aircraft engine: driving gears 176 and 177 rigidly fastened together mesh with gears 178 on impeller shaft 29, and 179 driven by a turbine 96 equipped with blades 115 preferably riveted to the turbine or fastened in any other way well known in turbine practice.

Entrance impeller blade ring held to a driving shaft 29 and to an impeller 42 having vanes 63 by a nut 183 suck the air into main impeller blades 63; these blades must be of straight radial design because of high rotative speeds used in superchargers (30,000 R. P. M. and more) in order to withstand stresses due to centrifugal force. At the exit from the blades 63 are discharge impeller blades 84 turned backwards (see Figures 10 and 13) to diminish the percentage of kinetic energy of fluid.

Figure 13:
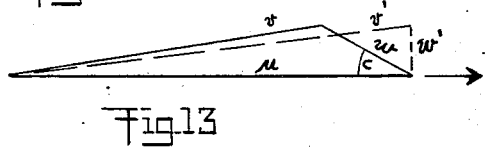

In diagram of Figure 13: $u$=peripheral velocity of the blades 84, $v$=absolute velocity of air from the blades 84, $w$=relative velocity between the blades, $c$=discharge angle of blades; $v'$ (dotted) =absolute velocity of air if radial blades were used ($<c=90°$), $w'$ (dotted) =corresponding relative velocity. The diagram plainly shows how the absolute velocity V' was diminished to V by backward turned blades 84.

Figure 10:
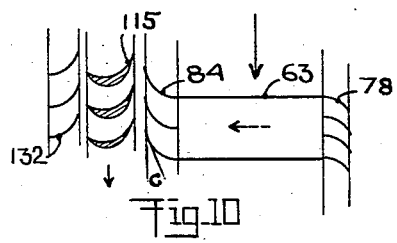
Figure 10 illustrates blading of the superchargers of Figures 8 and 9.

The blades 84 must be of substantially axial or semiaxial type and fastened by dovetailing to a disc 182 or otherwise as known in high speed turbine practice (especially De Laval) so they could withstand stresses due to centrifugal forces. In order to obtain full benefit of this reduction of absolute velocity and resulting decrease of kinetic energy of fluid by exit blades 84 sufficient guidance of the fluid must be provided. This is accomplished by proper ratio of pitch of vanes to depth or axial height of blades. Fig. 10 illustrates blades 84 having depth of blades or axial height of blades $h$ about equal to circumferential pitch $p$ of blades or, about equal to radius $r$ of the curvature of the blades. Similar rule must apply to blades 78 if the losses due to improper guidance are to be avoided. In the case of turbine blades 115, deviation angle of the fluid due to blades 115 being greater, necessary depth or axial height H of blades must be slightly greater than circumferential pitch P of the turbine blades, as can be readily seen in Fig. 10; this again to provide sufficient guidance in order to deflect the fluid properly, without losses due to turbulence, etc. The turbine is provided by balancing openings 354 and labyrinth seal 370.

Figure 12:
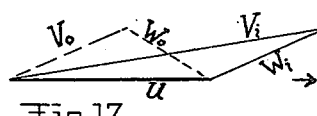
Figures 12 and 13 illustrate velocity diagrams of a turbopump.

In diagram of Figure 12 illustrating function of the turbine blades 115: U=peripheral velocity of blades 115, $W_1$=inlet relative velocity, $V_1$=absolute inlet velocity which equals to velocity $v$ of diagram Figure 13; $W_0$=outlet relative velocity, $V_0$=absolute outlet velocity. The velocity $V_0$ is transformed into pressure by diffusor blades 132 secured to a housing 184 having a bearing 180 to support a hub 185 integral with gear 179, to which hub turbine 96 is fastened.

It is obvious that no stationary diffusor is necessary when all kinetic energy of fluid is absorbed by turbine.

Figure 8:
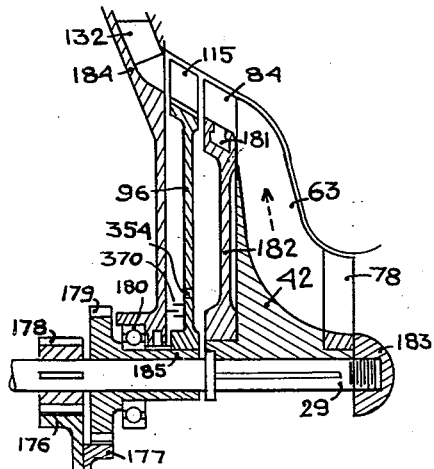
Figures 8 and 9 are longitudinal sections showing single stage superchargers.
Figure 9:
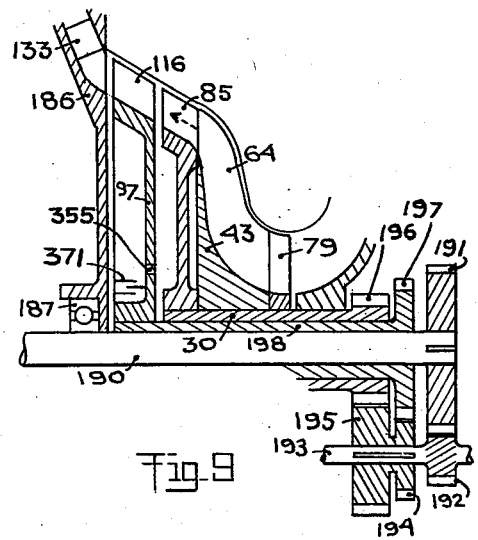

Figure 9 shows a similar aircraft supercharger as shown in Figure 8 and functioning in a similar way, the only difference being in drive:

A central shaft 190 driven by a crankshaft of an aircraft engine carries a gear 191 in mesh with a pinion 192 on a countershaft 193; to the countershaft are fastened gears 195 and 194 meshing with pinions 196 and 197; pinion 196 drives an impeller 43 by means of a hollow shaft 30; pinion 197 is driven by a turbine 97 by means of a hollow shaft 198; shaft 190 is supported by a bearing 187 in a supercharger housing 186 equipped with diffusion vanes 133. The impeller 43 has entrance blades 79, main blades 64 and exit blades 85 similar to blades 84. The turbine 97 carries blades 116 similar in design to blades 115.

Figure 11:
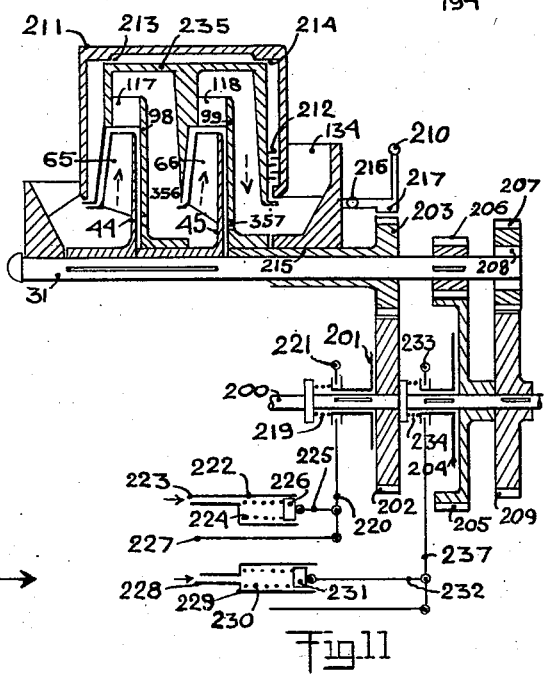
Figure 11 is a half longitudinal section through a two stage turbocompressor.

In Figure 11 is illustrated construction of a multistage (2 stages shown) aircraft supercharger having two speeds and stop-supercharging (without stopping rotation of the impeller and without wasteful throttling) and equipped with automatic as well as hand control to operate each speed or stop according to altitude in which the airplane operates, or at will, in fact, there are provided four different operating functions resulting in four different final pressures obtained by this supercharger, as will be shown in description:

A driving shaft 200 carries gears 202, 205 and 209 meshing with pinions: 203 driven by a hollow turbine shaft 215; pinion 206 secured to an impeller driving shaft 31 and finally pinion 207 which also drives the impeller shaft 31 but by means of one-way clutch 208. To the shaft 31 are secured impellers 44 with blades 65, and 45 with blades 66. Turbine 98 with blades 117, and 99 with blades 118 are mounted rigidly to the hollow shaft 215. Both turbines are secured to a rotary casing 235. Impellers and turbines rotate in a stationary housing 211 having "small clearance" rings 213, 214 and a labyrinth packing 212. Dotted arrow indicate again path of fluid.

Automatic and hand controlled drive functions as follows:

A hand lever 210 pivoted at 216 to the housing 211 applies a brake 217 against the pinion 203; whenever the brake is applied turbines stop from rotation and supercharger produces maximal pressure because more energy is put in, no energy being transformed back into mechanical energy by turbines. This compression is obviously not as efficient as normal operation with turbines rotating, but it serves its purpose very well for emergencies such as sudden overloads which often happen on multi engined airplanes or on cabin superchargers for stratosphere flights.

A cylinder 222 with a spring 224, a piston 226, a connecting rod 225 operates a clutch 201 by means of a lever 220 pivoted at 221:

Whenever atmospheric pressure against the piston 226 overcomes the spring 224 and pressure inside the cylinder 222 (the inside of the cylinder being connected to an engine manifold, not shown, or to the outlet end of an exhauster by a pipe 223) a lever 220, pivoted at 221, disconnects the clutch 201 against pressure of a spring 219 with result that gear 202 is free to rotate. When, however, spring 224 plus pressure inside of the cylinder 222 overcomes atmospheric pressure on the right side of the piston 226 the clutch 201 is connected and the gear 202 is put into rotation.

Whenever the turbines are free to rotate no reaction can be created within the supercharger and the result is that the impellers run free, not absorbing any energy nor creating any pressure, but simply not energizing the fluid because there cannot be any action where there is no reaction.

A cable 227 is provided for hand operation of the clutch 201 in emergencies or any time at will.

In a similar way a cylinder 229 with spring 230 operates a piston 231 and a connecting rod 232 by means of a lever 237 pivoted at 233.

It is expressly to be understood that springs 224 and 230 can be either compression or tension springs, as required.

Whenever atmospheric pressure on the right side of the piston 231 overcomes the spring 230 and pressure inside the cylinder 229 (the cylinder being connected to the engine manifold or to the outlet end of an exhauster) piston 231 and connecting rod 232 move to the left turning a lever 237 against a spring 234, thus disconnecting the clutch 204 and making the gear 205 run free. Whenever the gear 205 is free, power is transmitted from the shaft 200 to the shaft 31 by means of gear 209 to a pinion 207, then by a one-way clutch 208 to the shaft 31; this is the low speed of the impellers resulting in the low pressure of the supercharger.

When, however, the atmospheric pressure is low, piston 231 moves to the right and lever 237 connects the clutch 204 by means of spring 234. Whenever clutch 204 is connected, power is transmitted directly from the shaft 200 to the shaft 31 by means of gear 205 and pinion 206 (while pinion 207 rotates freely on its one-way clutch). This is the high speed of supercharger, resulting in high pressure rise in the manifold or in cabin.

Summarizing I have:

At sea level, turbines are free to rotate, resulting in no pressure rise.

At medium altitudes, turbine operating, but impeller rotates at low speed, resulting in moderate pressure rise.

At high altitudes, turbines operate normally and impellers rotate at high speed, resulting in high pressure rise.

At extremely high altitudes or in emergency (as on combat or stratosphere planes) turbines are stopped by brakes while impellers run at high speeds which results in maximal pressure rise.

The advantage of this construction against those hitherto known is obvious: without wasteful throttling I obtain four different increases of pressure necessary for different altitudes.

Figure 14 illustrates another multistage turbocompressor for supercharging aircraft engines with automatic altitude control.

A central shaft 240 supported by a hollow impeller shaft 32 and by bearings 290 and 297 supported by stationary compressor case 294 and transmission case 253 and driven by a crankshaft (not shown) drives a gear 241 in mesh with pinion 242 which is integral with gears 243 and 244. These gears are mounted freely on a countershaft 250 supported by bearings 251 and 252. Gear 243 drives a pinion 246 while gear 244 drives a pinion 247 and then one-way clutch 248.

Pinion 246 being integral with outer clutch part 300 drives a disc 301 whenever the wedges 302 are forced from the center by means of rollers 304 and conical surface 306 of a sliding sleeve 305. By means of this clutch pinion 246 drives a hollow shaft 32 supported by bearings 287 and 307 which shaft in turn rotates impellers 46 and 47. The impellers are provided by entrance blades 80 and 81 and by axial exit blades 86 and 87, preferably dovetailed to impellers. The numerals 295, 372, 373 indicate labyrinth seals; numerals 358, 359, 360, and 361 indicate fluid pressure balancing holes; numerals 291, 292, 293 represent seal or packing rings. The numerals 380—384 represent "small clearance" rings to prevent short circuiting of the fluid.

Second stage turbine diffusor blades 119 are secured to a rotary flange 100 on one side and to a rotary housing 281 on the other side; the flange 100 is supported by a bearing 287 secured to the hollow impeller shaft 32. Housing 286 is fastened to a first stage rotary housing 285 which in turn is carried by a rotary flange 284 fastened to a sleeve 282 equipped by a diffusor gear 249 and supported by a bearing 283 which in turn is secured in the transmission case 253.

First stage turbine diffusor blades 120 are secured between the housing 286 and a shroud 101 and are of a similar design as the blades illustrated in Figures 1, 10, 22, or 22A. The gear 245 is in mesh with the turbine diffusor gear 249; the gear 245 is either:

(A) Coupled by the clutch 255, or,
(B) Free to rotate on the shaft 250, or
(C) Stopped from rotation by a brake 275 for emergency purposes.

Shaft 250 carries freely a gear 245 and a sliding friction clutch 254 with a spring 255; a lever 257 pivoted at 256 and operated by a connecting rod 258 and piston 259, locks and unlocks the clutch according to which side of piston the oil pressure (or any other fluid under pressure) is admitted in a cylinder 261 through a pipe 262 or a pipe 263. A valve 265 regulated by a lever 266, connecting rod 267, diaphragm 268 and spring 270; a pipe 269 connects the inside of the diaphragm with a manifold (not shown) or with the exit from the supercharger.

In Figure 14A is shown the outlet for the oil from the cylinder 261; a valve 271 connected to the valve 265 and operated by the same lever 266 connects the cylinder 261 either with a pipe 273 or a pipe 274 and drains one side of the piston 259 so the oil on the other side of the piston could move the piston toward the side being drained.

Whenever the pressure in manifold or in outlet from supercharger increases the diaphragm 268 expands pushing lever 266 to the left which opens pipe 263 to pressure oil coming from pipe 264; at the same time lever 266 turns the valve 271 so the pipe 274 could drain the right side of cylinder 261, which results in piston 259 moving to the right. The piston pulls rod 258 and disconnects the clutch 254 against pressure of a spring 255. Turbines having blades 119, 120 of substantially similar diverging or "antireaction" design as illustrated in Figures 1, 10, 22 and 22A are then free to rotate, as there is no or very little reaction there can be no or very little action and therefore supercharger produces no or very little pressure.

Similar control (not shown) by manifold pressure and oil pressure is intended for control of clutch 301 which results in:

(a) Transmitting power to impellers by large pinion 247 and one-way clutch 248 which is a low speed drive, main clutch 301 being disconnected, or (b) Transmitting power to impellers by a small pinion 246 and through clutch 301 which is a high speed drive.

For emergency purposes when maximal air pressures are needed there is a brake 275 provided, which stops gear 245 and thus the turbines from rotation which in turn produces maximal air pressures. The brake is operated at will by a lever 278 pivoted at 279.

Thus I have provided in this embodiment:

(a) No or very small increase of air pressure for sea level because turbines are free to rotate;
(b) Small pressure increase for moderate altitudes when turbines operate normally and impellers rotate at low speed;
(c) High pressure increase for high altitudes when turbines operate normally and impellers rotate at high speeds;
(d) Maximal air pressure for emergency or special purposes when turbines are stopped and impellers rotate at high speed.

Figure 15 illustrates a vertical supercharger where friction roller drive is used to increase speed of impellers. A driving shaft 310 supported in a supercharger housing 316 drives a roller cage 311 with larger rollers 312 and smaller rollers 313; rollers 312 support and operate impeller shaft 33 with impeller 44, with main blades 69, outlet impeller blades 88, which impeller is fastened to its shaft by taper fitting and a nut 317, while smaller rollers 313 support and rotate a turbine hub 315 integral with turbine 102 equipped with blades 121. Both, smaller and larger rollers rotate in a stationary sleeve 314 pressed in the housing 316. Due to the size of rollers the hub 315 rotates slower than the shaft 33.

It is obvious that gears could be used instead of rollers; in that case sleeve 314, shaft 33 and hub 315 would have gear teeth to mesh. Numeral 136 represents a diffusor, numeral 362 indicates a balancing hole.

Figures 16 and 17 illustrate a gas or steam turbine driven supercharger. Gas or steam coming out from a stationary nozzle 320 enters into rotating nozzles 321 and then into main turbine or driving blades 322 which blades are carried by a disc 324 mounted to the shaft 34 which carries also an impeller 50 with impeller blades 70; this shaft is supported by bearings 326 and 327.

Nozzles 321 carried by a disc 323 are mounted on a hollow shaft 325 which is supported in a housing 328 and carries on its other end a pumping turbine 103 with blades 122; stationary diffusion blades 137 are provided in the housing 328.

The advantage of rotary nozzles 321 is shown in Figure 17: nozzles rotating in the direction of turbine rotation can have larger discharge angles C than stationary nozzles shown in dotted lines with discharge angle C' because rotating velocity adds to the peripheral velocity of gas.

Figure 18 illustrates a double turbocompressor to balance axial thrust. A main driving shaft 35 supported by bearings 333 and 334 in a housing 332 drives impellers 51 and 52 with blades 71 and 72. At the periphery of impellers there are turbine blades 123 and 124 of a turbine 104; this turbine being supported by bearings 335 and 336 drives inlet impeller 330 on one side and 331 on the other side, forcing the air into the main impeller blades 71 and 72. In this way it is not necessary to gear the turbine to the impeller or to the driving shaft because the energy absorbed by the turbine is used by entrance impellers and does not need to be returned. Numerals 138, 142 represent diffusors, numerals 365, 366 indicate balancing holes.

Figure 19 shows another embodiment of the invention suitable for highest speeds where turbine energy is used up directly in compressing the fluid so the turbine does not need to be geared to the impeller or to the driving shaft.

A driving shaft 36 supported by bearings 340 and 341 drives an impeller 53 having entrance blades 82, main blades 73 and outlet blades 89 dovetailed into impeller. On the same shaft is mounted free to rotate a turbine 105 with blades 125; the turbine is integral with a secondary impeller 54 having entrance blades 83, main blades 74 and outlet blades 90. The main impeller, turbine and secondary impeller rotate in a stationary housing 342 having a diffusor 139 and diffusor 140 and said bearings 340 and 341. Numerals 367, 368 represent balancing openings, numerals 375, 376 indicate labyrinth seals.

All kinetic energy absorbed by the turbine 105 is transmitted to the secondary impeller where again pressure and velocity head is produced. However, the speed of this secondary impeller is only about half the speed of the main impeller; thus the losses in kinetic energy are much smaller.

Figure 21 represents a typical design of a centrifugal pump constructed according to the invention.

The pump in Figure 21 consists of an impeller 76 and rotary diffusor 127 (or turbine), rotating within a case 153 and a stationary diffusor or guide wheel fastened to the case. Fluid enters the impeller at the center, flows radially outward, is discharged from the impeller into the turbine 127, into a stationary diffusor 141 and finally into a spiral case 153. During this flow thru the impeller the fluid has received its energy from the vanes 77 resulting in an increase both, in pressure (potential energy) and velocity (kinetic energy). Since the large part of the energy of the fluid at discharge from the impeller is kinetic (about 50% with radial vanes) it is necessary to transform it or, at least greater part of it, into mechanical energy by a substantially impulse turbine 127 since it is impossible by present day methods to transform it into pressure very efficiently by diverging diffusor vanes.

The turbine blades rotating at about half of the impeller speed or a little faster are preferably not entirely impulse blades but somewhat diverging blades (antireaction) as shown in Figure 22. Full arrow shows the direction of rotation, dotted arrow designates direction of fluid flow between blades 128. Blade angle of discharge C is larger than blade angle of entrance B which is just the opposite of construction of reaction blades: hence, the name "antireaction." Of course, in some cases purely impulse blades and in other cases even reaction blades can be used for smaller pressures.

The kinetic energy absorbed from fluid by the turbine can be either brought back to the impeller shaft by proper gearing or belting, or can be used for some other purpose such as driving accessories on airplanes which are not shown here, etc.

The pump illustrated in Figure 20 differs from the pump in Figure 21 only by having a volute chamber 151 instead of a stationary diffusor. Numeral 76 indicates impeller blades, 126 represents turbine blades, 152 is a spiral case.

All other pumps or compressors function in a similar way as described in the case of Figure 21.

Figure 22 illustrates turbine antireaction blades 128 having entrance angle B smaller than discharge angle C. Figure 22A shows turbine blades 128A of streamline shape with thick and round entrance edges for variable angle B. Turbine blades used in the embodiments of the invention can be called: "diffusor blades absorbing energy" or, "turbine diffusor blades" or "rotary diffusor" or "antireaction blade wheel."

Basically the invention is a pumping device energizing a fluid, whereas part of the fluid energy is transformed back into mechanical energy by a substantially rotary diffusor.

The invention represents a new method of pumping a fluid by producing potential and kinetic energy in the fluid and then absorbing part of one of the energies from the fluid by a substantially rotary diffusor.

The invention is basically a pump energizing a fluid, whereas part of the fluid energy is transformed back into mechanical energy in order to assist in driving the pump.

I claim:

1. A fluid compressor comprising an outlet for the fluid, an impeller producing potential and kinetic energy in the fluid and forcing the fluid thru the outlet out of the compressor, a rotary diffusor absorbing the kinetic energy from the fluid, an operative connection between the impeller and the diffusor to transmit the absorbed energy from the diffusor to the impeller, means to disengage said connection, and means to stop the rotary diffusor from rotation so as to increase the fluid pressure at the outlet.

2. In a combination, a fluid compressor comprising an impeller producing potential and kinetic energy in the fluid to be compressed, a turbine absorbing the kinetic energy from the fluid, and a gas, steam or exhaust turbine driving said compressor, and comprising rotary nozzles and a turbine runner, said impeller driven by said turbine runner, said rotary nozzles rotated by said turbine, said nozzles discharging a gas into said turbine runner.

3. A fluid compressor comprising a casing, an impeller in the casing producing potential and kinetic energy in the fluid, the impeller having radial main blades and substantially axial exit blades, said exit blades curved backwards to reduce amount of the kinetic energy, circumferential spacing or pitch $p$ of the exit blades being about equal or smaller than the axial height $h$ or depth of the blades, or, mathematically: $p \leq h$, and a turbine absorbing part of the energy from the fluid.

4. A fluid compressor comprising a casing and an impeller in the casing producing potential and kinetic energy in the fluid, the impeller having main radial blades and substantially axial exit blades, said exit blades being curved backwards to reduce amount of the kinetic energy, circumferential spacing or pitch $p$ of the exit blades being about equal to radius of curvature $r$ of the exit blades or, mathematically expressed: $p=r$, and a turbine absorbing part of the energy from the fluid.

5. A fluid compressor comprising a casing, an impeller producing potential and kinetic energy in the fluid and a turbine absorbing part of the energy from the fluid in the casing, the impeller having radial main blades and substantially axial exit blades, said exit blades curved backwards to reduce amount of the kinetic energy, and mechanical means transmitting energy from the turbine to the impeller.

V. S. DE BOLT.